US012044045B2

(12) United States Patent
Carmo

(10) Patent No.: US 12,044,045 B2
(45) Date of Patent: Jul. 23, 2024

(54) VEHICLE DOOR OPENING ASSEMBLY

(71) Applicant: MINEBEA ACCESSSOLUTIONS SOUTH AMERICA LTDA, Guarulhos—SP (BR)

(72) Inventor: Paulo Sergio Carmo, Guarulhos—SP (BR)

(73) Assignee: MINEBEA ACCESSSOLUTIONS SOUTH AMERICA LTDA, Guarulhos—SP (BR)

( * ) Notice: Subject to any disclaimer, the term of this patent is extended or adjusted under 35 U.S.C. 154(b) by 15 days.

(21) Appl. No.: 17/606,831

(22) PCT Filed: Apr. 29, 2019

(86) PCT No.: PCT/BR2019/050156
§ 371 (c)(1),
(2) Date: Oct. 27, 2021

(87) PCT Pub. No.: WO2020/220097
PCT Pub. Date: Nov. 5, 2020

(65) Prior Publication Data

US 2022/0205288 A1 Jun. 30, 2022

(51) Int. Cl.
*E05B 81/76* (2014.01)
*E05B 85/10* (2014.01)

(52) U.S. Cl.
CPC .................................... *E05B 85/10* (2013.01)

(58) Field of Classification Search
CPC ............................... Y10T 292/11; E05B 85/10
See application file for complete search history.

(56) References Cited

U.S. PATENT DOCUMENTS 4,054,944 A 10/1977 Lau
5,878,610 A * 3/1999 Friedrich ................ E05B 17/22 70/264

(Continued)

FOREIGN PATENT DOCUMENTS

CN 101787827 A 7/2010
CN 103670004 A 3/2014

(Continued)

OTHER PUBLICATIONS

International Search Report issued on Jan. 23, 2020 in PCT/BR2019/050156 filed Apr. 29, 2019, 2 pages.

(Continued)

*Primary Examiner* — Carlos Lugo
(74) *Attorney, Agent, or Firm* — Oblon, McClelland, Maier & Neustadt, L.L.P.

(57) ABSTRACT

A vehicle door handle to control the opening of a vehicle door includes a door latch mechanism to release the vehicle door when actuated and a handling element mobile with respect to a handle frame between a rest position and an actuation position in which it actuates the door latch mechanism. The vehicle door handle also includes at least one static magnetic element fixed in motion with the handle frame and at least one mobile magnetic element solidary in motion with the handling element, generating a haptic feedback by defining stable or unstable positions of the handling element in which the static and mobile magnetic element face and attract or repel each other.

8 Claims, 3 Drawing Sheets

(56) References Cited

U.S. PATENT DOCUMENTS

| | | | | |
|---|---|---|---|---|
| 6,072,403 | A | 6/2000 | Iwasaki et al. | |
| 6,459,373 | B1 * | 10/2002 | Edwards | E05B 81/78 70/264 |
| 6,765,472 | B2 * | 7/2004 | Suparschi | G07C 9/00309 340/5.63 |
| 7,775,567 | B2 * | 8/2010 | Ligtenberg | E05C 19/16 292/DIG. 37 |
| 8,016,330 | B2 * | 9/2011 | Fullerton | H01F 13/003 335/306 |
| 10,597,918 | B2 * | 3/2020 | Kauppila | E05C 19/16 |
| 10,815,690 | B2 * | 10/2020 | Mohammed | E05B 47/0038 |
| 2001/0004233 | A1 | 6/2001 | Suparschi et al. | |
| 2007/0007775 | A1 * | 1/2007 | Gallas | E05C 19/16 292/251.5 |
| 2009/0284253 | A1 * | 11/2009 | Finkler | G01D 5/2046 324/207.2 |
| 2014/0306692 | A1 * | 10/2014 | Santos | G01D 5/24461 324/160 |
| 2015/0233160 | A1 | 8/2015 | Rogers | |
| 2016/0004289 | A1 | 1/2016 | Chung et al. | |
| 2016/0042897 | A1 | 2/2016 | Qian | |

FOREIGN PATENT DOCUMENTS

| | | | |
|---|---|---|---|
| DE | 2455520 | A1 * | 5/1976 |
| DE | 101 55 340 | C1 | 12/2002 |
| DE | 20 2011 051 817 | U1 | 3/2013 |
| DE | 10 2016 014 773 | A1 | 6/2018 |
| EP | 0585559 | A1 * | 3/1994 |
| JP | 56-133059 | U | 10/1981 |
| JP | 2001-227205 | A | 8/2001 |
| JP | 2006-305196 | A | 11/2006 |
| JP | 2014-145224 | A | 8/2014 |

OTHER PUBLICATIONS

Office Action issued Dec. 7, 2021 in corresponding European Patent Application No. 19721522.1. 3 pages.

Combined Chinese Office Action and Search Report issued Jun. 27, 2022 in Chinese Patent Application No. 201980096241.1, 6 pages.

* cited by examiner

VEHICLE DOOR OPENING ASSEMBLY

BACKGROUND

The invention relates to a door opening assembly to control the opening of a vehicle door, in particular to door latches and to a haptic feedback generating system.

Vehicle door latches or opening assemblies selectively lock or release vehicle door panels. To actuate the vehicle door latch, the user provides energy to actuate a latch mechanism through grasping and moving a handle lever, knob or other. In particular, most door latches comprise mechanical haptic feedback system generating a variable braking or reaction force which is acting against the opening action of the user.

Once the door panel is released, the user or an electric panel actuator swings or slides the panel to grant physical access the vehicle. The actuation signal is in particular generated after execution of an authentication process, using for example the remote detection of an authentication token such as a RFID card or module, a Bluetooth connected phone etc. or simply the insertion and turning of a key in a cylinder lock.

To provide the haptic feedback, systems such as bistable spring or elastic devices are used. Such systems comprise, for example an elastic element or a spring that is compressed, a slider or finger at the end of the compressed spring, and a protrusion creating with the finger a varying resistive force that changes during the motion of the handle.

The user consequently experiences a feedback force that, during a first portion of the motion, increases gradually until reaching a maximum value, and then decreases or even becomes an assisting force. The decrease or inversion of the feedback force is preferably sharp, so as to generate the sensation of "clicking" giving the user confirmation that his action did actuate the latch mechanism.

The haptic feedback mechanism containing bistable mechanisms based on springs or other elastic elements generally imply that some elements slide along each-other, with potentially strong friction. The friction causes the sliding elements wear, and contributes to a shorter lifespan of the vehicle door handle.

BRIEF SUMMARY

In order to overcome the aforementioned drawbacks, the invention proposes a vehicle door handle to control the opening of a vehicle door comprising a door latch mechanism, configured to release the vehicle door when actuated, and a handling element mobile with respect to a handle frame between a rest position and an actuation position in which it actuates the door latch mechanism, characterized in that it comprises at least one static magnetic element fixed in motion with the handle frame and at least one mobile magnetic element solidary in motion with the handling element, generating a haptic feedback by defining stable or unstable positions of the handling element in which the static and mobile magnetic element face and attract or repel each other.

The magnets generate a feedback force without mechanical friction to generate said force. The guiding means can be optimized for reduced friction and thus the potential lifespan of the latch can be improved.

The vehicle door latch may present one or more of the following characteristics.

It may comprise guiding means for the motion of the handling element comprising static guiding means attached to the handle frame, and mobile guiding means attached to the handling element, and in that the static magnetic element is attached to the static guiding means and the mobile magnetic element is attached to the mobile guiding means.

The static and mobile guiding means may comprise a guiding finger and a rail or sheath along which the guiding finger slides in translation during motion of the handling element.

The mobile guiding means may comprise a rotor and the static guiding means may comprise a stator, the rotor and stator moving with respect to each other in rotation during motion of the handling element.

The static or mobile magnetic elements may comprise magnets.

The static and mobile magnetic elements may comprise magnets of opposing polarity defining, when facing each other, unstable positions by repelling each other.

The static and mobile magnetic elements may comprise magnets of similar polarity defining, when facing each other, at least one stable position by attracting each other.

At least one of respectively the static and mobile magnetic elements may comprises magnets of alternating polarity, defining, when facing at least one magnet of respectively the mobile or static magnetic element at least one unstable position by repelling each other and at least one stable position by attracting each other.

The static and mobile magnetic elements may comprise at least one permanent magnet.

The magnetic elements may comprise at least one electromagnet.

One of respectively the static or mobile magnetic elements may comprise at least one magnet, and the other may comprise at least one metallic protuberance defining, when facing a stable position of the handling element.

Either the static guiding element or the mobile guiding element comprise at least two magnetic elements defining at least two unstable intermediary positions with a stable position in between said unstable positions.

When the handling element reaches the stable position, an instruction may sent to an authentication unit to cause said authentication unit to interrogate the presence of a security token carried by the user and authenticate said security token.

BRIEF DESCRIPTION OF THE DRAWINGS

Other characteristics and advantages of the invention will appear at the reading of the following description, given in an illustrative and not limiting fashion, of the following figures, among which.

DETAILED DESCRIPTION

In all figures, the same references apply to the same elements.

Though the figures refer to precise embodiments of the invention, other embodiments may be obtained by combining or altering slightly the represented embodiments. Said new embodiments are also within the scope of the invention.

For spatial orientation, a longitudinal horizontal axis x is defined along the normal forward motion of the considered vehicle with straight wheels (i.e. when not turning). A vertical top-down axis z is defined using gravity when considering the vehicle on flat terrain. The wheel axes (when straight) define a transverse axis, orthogonal to the previous two axes. Terms such as "inwards" "outwards" etc. are defined with respect to an outer surface of the vehicle, corresponding to the apparent bodywork when viewing the vehicle from outside its cabin.

Figure 1A:
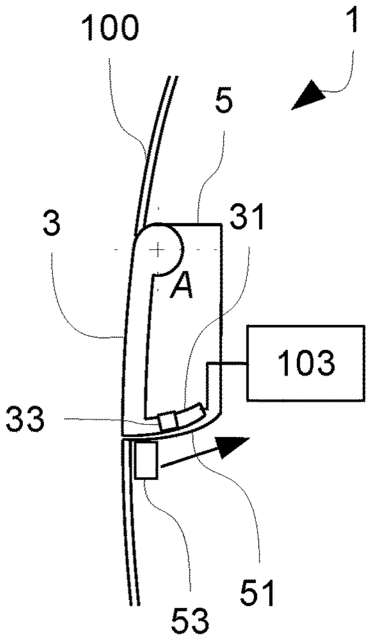
FIGS. 1*a*, 1*b*, 1*c* are schematic representations of a vehicle door opening assembly in different positions over an actuation of the assembly.
Figure 1B:
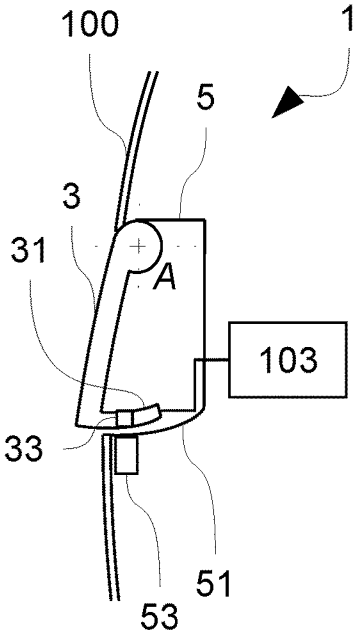
Figure 1C:
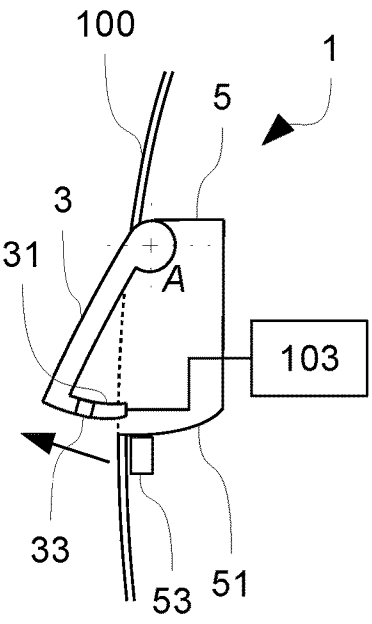

FIGS. 1*a*, 1*b* and 1*c* are schematic cutaways of a vehicle door with a door panel 100 and a built-in door latch 1. The door panel 100 forms an exterior surface of the vehicle, the door latch 1 is essentially represented by a handling element 3 which is the part meant to be grasped and set in motion by a user and a handle frame 5 which is the part that remains stationary during actuation. The handling element 3 is here a handle lever mobile in rotation between a rest position (FIG. 1*a*) and an actuation position (FIG. 1*c*) around a rotation axis A.

According to alternative embodiments, the handling element 3 can comprise a handle knob or push button.

The terms like "inwards", "outwards" and equivalents are defined with respect to the vehicle interior and exterior.

In the first cutaway of FIG. 1*a*, the handling element 3 is in a rest position. Said rest position is adopted in absence of interaction with a user. To cause an automated return of the handling element 3 in said rest position, the door latch 1 may comprise a return spring (not represented) that causes the return to rest position when the user releases the handling element 3.

In the second cutaway of FIG. 1*b*, the handling element 3 is in an intermediary position. In said intermediary position, the handling element 3 has rotated outwards by a predefined angle (20 to 45° for example) around a handle axis A, due to the opening action of the user who sets the handling element in motion.

In the third cutaway of FIG. 1*c*, the handling element 3 is in an actuation position. In said actuation position, the handling element 3 has been rotated further outwards (40° to 60° and more) by the user, and the handling element 3 interacts with a latch mechanism 103 to release the door panel, which can consequently be opened by pulling further on the handling element 3.

The rest and actuation positions (FIGS. 1*a* and 5*c*) are in particular defined by abutments as extremal positions. In particular, the abutments may be relative and/or displaceable by a push of the user or by an electric motor, in particular in the case of flushing door latches.

In a flushing door latch, the handling element 3 can adopt a flush position in which it is flush with the bodywork of the vehicle. An electric motor brings the handling element 3 from its flush position into a ready position when specific conditions are met. The specific conditions can for example be the detection of a contact of the user through a capacitive detector on the handling element, the detection of a security token (key card, RFID transmitter, Bluetooth connected phone with a cryptographic key etc.) in a predetermined area close to the vehicle etc.

To move the handling element 3 from its flush to its ready position, the electric motor sets a mobile abutment in motion against the action of the return spring. The ready position then corresponds to the rest position of FIG. 1*a* while not being an absolute extremal position.

In flushing position, the handling element 3 is less likely, when parked, to be interacted with by passers-by and air drag is reduced when driving. In the flushing position, the handling element 3 also appears integrated in the door panel 100 in a pleasant and discrete way.

The handling element 3 and the handle frame 5 comprise guiding elements, a mobile guiding element 31 and a static guiding element 51. The mobile guiding element 31 is attached to or integrally formed with the handling element 3, the static guiding element 51 is attached to or integrally formed with the handle frame 5.

In particular, in the embodiment of FIGS. 1*a*, 1*b*, 1*c*, the mobile guiding element 31 is a circular arc shaped finger attached to the extremity of the handling element opposite rotation axis A, and the static guiding element 51 is a circular arc rail along which the mobile guiding element 31 glides. To further reduce friction between said guiding elements 31, 51, bearings such as needle or ball bearings can be implemented between the two.

The mobile guiding element 31 and the static guiding element 51 comprise respectively a mobile magnetic element 33 attached to the mobile guiding element 31 and a static magnetic element 53 attached to the static guiding element 53. Said magnetic elements 31, 51 are here in particular magnets, for example permanent magnets such as neodymium magnets.

The mobile and static magnets 33, 53 are attached to their respective guiding element 31, 51 so that in the rest and actuation positions of FIGS. 1*a* and 1*c*, they are at a maximum distance of each other, and reach a minimum distance to each other in the intermediary position of FIG. 1*b*.

In particular, the mobile and static magnets 33, 53 are oriented with opposing polarities (see arrows in FIGS. 3*a*, 3*b*, 3*c*) so that in the intermediary position both their north or south poles face each other so that a repelling force is generated.

Figure 2:
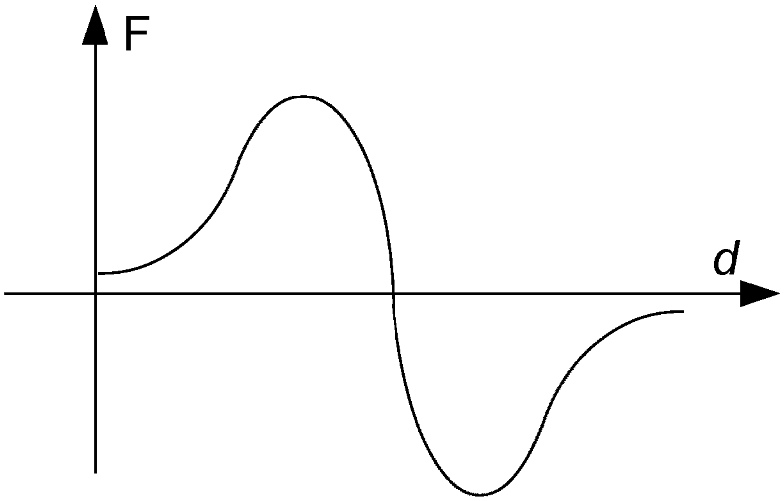
FIG. 2 is a graph of the resistive feedback force as felt by a user over the course of an actuation of the assembly.

FIG. 2 is a graph of the resistive feedback force F or torque (in N or Nm) felt by the user during motion of the handling element between its rest and actuation position as a function of the displacement din length or angle (in cm or angular degrees °).

The starting point at null displacement is a relatively small but positive resistive force, corresponding essentially to the opposing force or torque applied on the handling element 3 by the return spring, which the user as to overcome to set the handling element 3 in motion.

The resistive force F then increases with the displacement d along a first interval. During said interval, the static magnet 53 and the mobile magnet 33 come closer to each other with the increasing displacement d.

When the mobile and static magnets 33, 53 come face to face, the repelling force becomes orthogonal to the displacement. As a consequence, the perceived resistive force F suddenly decreases and becomes null when the mobile and static magnets 33, 53 face each other.

When the displacement d increases, the force becomes negative and increases in absolute value in a rapid fashion:

the magnets 33, 53 repelling each other now aid in the direction of increasing displacement.

The rapid decrease and inversion in the perceived resistive force F is perceived by the user in form of a "clicking" or snapping in of mechanical nature even though no mechanical contact or overcoming of an elastic force takes place.

Tuning of the perceived haptic force F and thus of the haptic feedback can be done by selecting magnets with a more or less important magnetic moment and by modifying the relative distance between the magnetic elements 33, 53 when they are at their closest position to each other.

For tuning of the haptic force F, at least one of the magnetic elements 33, 53 can be an electromagnet with a tuneable current feed. Preferably the static magnetic element 53 can comprise an electromagnet to define stable or unstable positions of the handling element with a tuneable repelling or attracting strength. In particular, the electromagnet can be selectively fed electric current when the contact of a user with the handling element is detected using a capacitive detector, or when a remote authentication token such as a RFID tag or a Bluetooth phone containing a cryptographic key enters a predetermined perimeter around the vehicle.

Figure 3A:
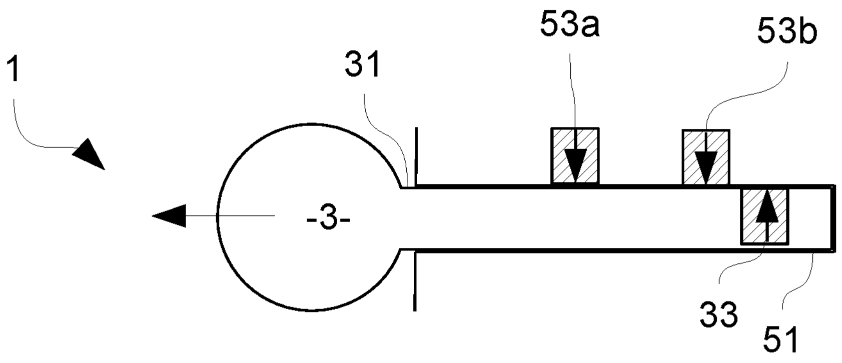
FIGS. 3*a*, 3*b*, 3*c* are schematic representations of another embodiment of vehicle door opening assembly in different positions over and actuation of the assembly.
Figure 3B:
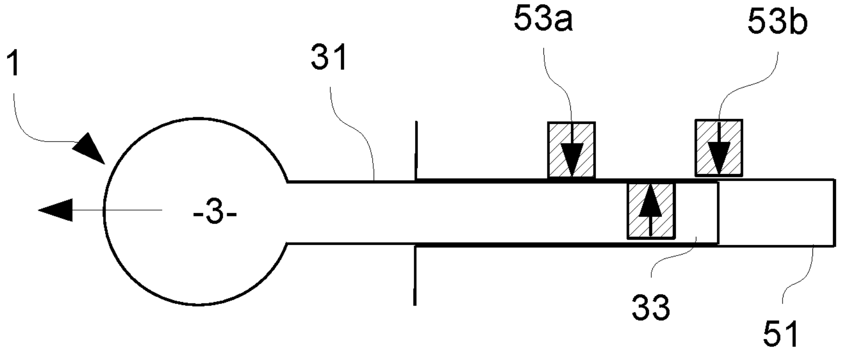
Figure 3C:
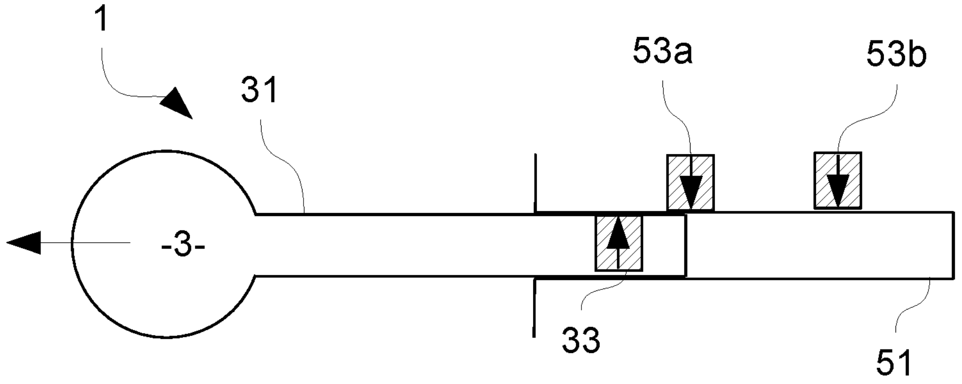

FIGS. 3*a*, 3*b*, 3*c* illustrate the case of a handle 1 with two unstable positions U1, U2, and a stable position S in between the two unstable positions.

In said figures, the represented mobile guiding means 31 comprise a guiding finger, and the represented static guiding means 51 comprise a sheath for the guiding finger forming a rail guiding the sliding motion of the guiding finger.

The motion of the handling element 3 causes the guiding finger to slide out of the sheath that contains it in the rest position (FIG. 3*a*).

The static magnetic elements 53 comprise two static magnets 53*a*, 53*b*, and the mobile magnetic element 33 comprises a single magnet, with a polarisation opposite that of the static magnets 53*a*, 53*b*.

When in rest position, as depicted in FIG. 3*a*, the mobile magnetic element 33 is situated beyond the two static magnets, and is consequently repelled by both static magnets 53*a*, 53*b*, and rests against an abutment.

When the user pulls on the handling element 3, the mobile magnetic element 33 gets closer to the first static magnet 53*a* (on the right in FIGS. 3*a*, 3*b*, 3*c*), until it is situated face to face with said first static magnet 53*a*, defining the first unstable position U1. In said first unstable position the resistive force decreases abruptly and changes orientation, which is felt by the user as a first noiseless "click".

Once the repelling force of the first static magnet 53*a* is overcome and the motion continues, the mobile magnetic element 33 reaches the stable position S depicted in FIG. 3*b*, where the repelling forces of both static magnets 53*a*, 53*b* cancel each other out.

When the handling element 3 reaches said intermediary stable position S, a control unit of the latch 100 and of an authentication unit may cause said authentication unit to interrogate the presence and authentication value of a security token carried by the user to unlock the door if authentication is positive. The control unit and the locking mechanism 103 may, in case of negative authentication, prevent further outward motion of the handling element 3.

To continue the motion of the handling element 3, the user has to overcome the repelling force of the second static magnet 53*b*: the mobile magnetic element 33 gets closer to the second static magnet 53*b* (on the left in FIGS. 3*a*, 3*b*, 3*c*), until it is situated face to face with said second static magnet 53*b*, defining the second unstable position U2.

Beyond the second unstable position U2, as depicted in FIG. 3*c*, the mobile magnetic element 33 is repelled by both static magnets 53*a*, 53*b* until it rests against an abutment and reaches the actuation position.

Figure 4:
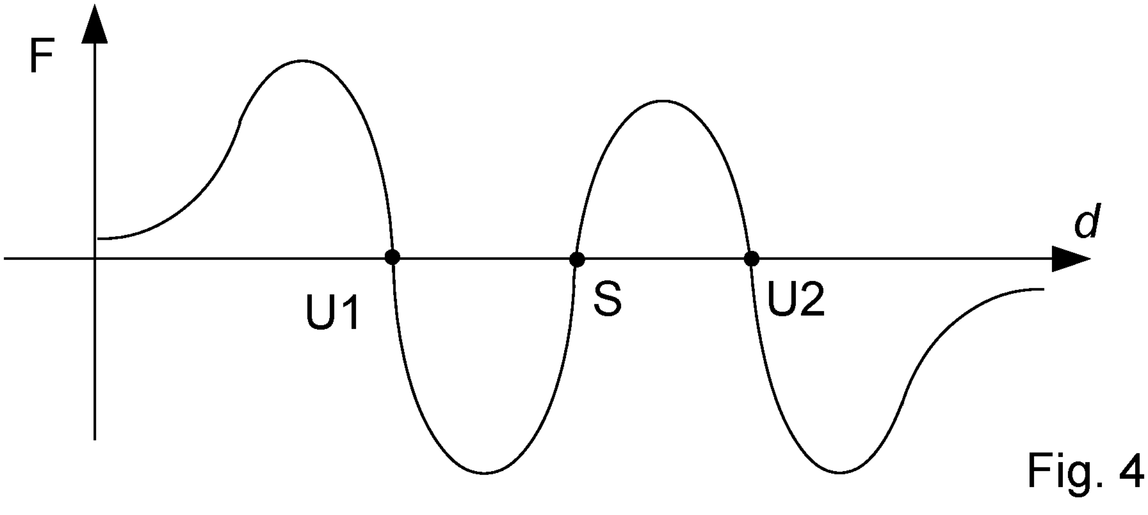
FIG. 4 is a graph of the resistive feedback force as felt by a user over the course of an actuation of the assembly according to FIGS. 3*a*, 3*b*, 3*c*, FIGS. 5 and 6 are schematic representations illustrating alternative embodiments of opening assemblies

The resistive force F or torque as perceived by the user is represented in the graph of FIG. 4.

FIG. 4 is a graph of the resistive strength F as a function of the displacement d in similar fashion to FIG. 2.

At first, the resistive force F is positive but relatively weak. When the displacement d increases, the mobile magnetic element 33 comes closer to the first static magnet 53*a* and the resistive force increases consequently until it reaches a maximum when the mobile magnetic element 33 and the first static magnet 53*a* come close to each other and decreases abruptly when they come face to face, thus defining the first unstable position U1.

When the displacement d further increases, the resistive force F becomes negative (it assists the motion of the handle lever 3) and quickly increases in absolute value, until it reaches a maximum. After said maximum, it decreases again in absolute value since the repelling force of the second static magnet 53*b* starts to counteract the repelling force of the first static magnet 53*a*.

When both repelling forces of the first and second static magnets 53*a*, 53*b* cancel each other out, the resistive force F is null. This defines the stable position S.

When the displacement d further increases, the resistive force F increases due to the increasing repelling force of the second static magnet 53*b* until the mobile magnetic element 33 and the second static magnet 53*b* come close to each other and decreases abruptly when they come face to face, thus defining the second unstable position U2.

Beyond said second unstable position U2, the resistive force increases again abruptly until a maximum and then decreases until the actuation position is reached, where an abutment prevents further outward motion.

Figure 5:
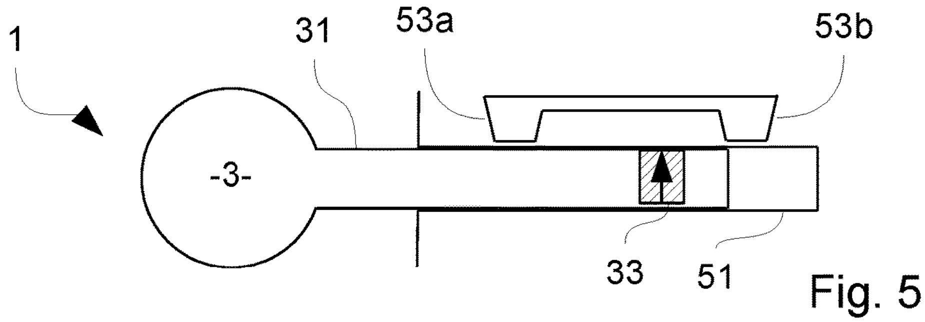

FIG. 5 depicts an alternative embodiment of a handle 1 in similar fashion to FIGS. 3*a*, 3*b*, 3*c*, with a guiding finger 31 gliding in a sheath 51.

In the embodiment of FIG. 5, the static magnetic element 53 comprises a metallic element, with a first protuberance 53*a*, and a second protuberance 53*b*. The metallic element is in particular made of ferromagnetic metal such as iron or steel.

The protuberances 53*a*, 53*b* have a more important cross section and reach out in direction of the mobile magnetic element 33, which is here a magnet, in particular a permanent magnet.

The protuberances 53*a*, 53*b* face the mobile magnetic element 33 when the handling element 3 reaches predetermined stable positions. In said stable positions, the mobile magnetic element 33 is attracted to the protuberance 53*a* or 53*b* it faces in particular with a strength overcoming the force of the return spring to stabilize the considered position.

Other embodiments may comprise more than two protuberances 53*a*, 53*b*, or may combine protuberances 53*a*, 53*b* with static magnets. Also, the mobile magnetic element 33 may comprise a metallic element and the static magnetic element 53 may comprise magnets.

According to another embodiment, the protuberances 53*a*, 53*b* may be replaced at least partially with magnets having a polarization in the same direction as the mobile magnetic element 33.

Figure 6:
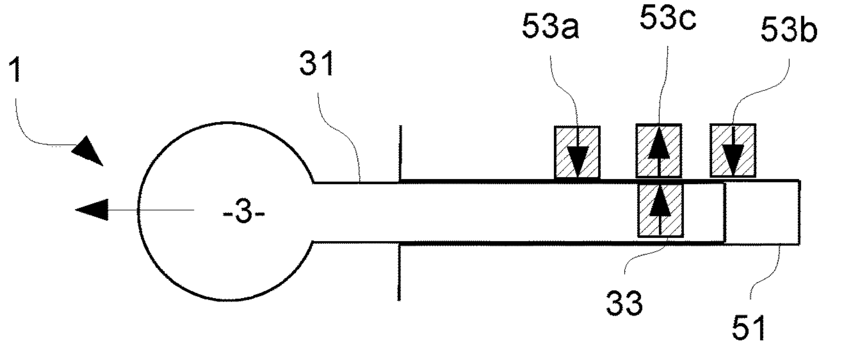

FIG. 6 depicts another alternative embodiment of a lock 1 with a guiding finger 31 gliding in a sheath 51.

In the embodiment of FIG. 6, the static magnetic elements 53 comprise magnets with alternating polarizations. The mobile magnetic element 33 also comprises a magnet.

Two extremal magnets 53*a*, 53*b* are polarized in opposite direction with respect to the mobile magnetic element 33. An intermediary magnet 53*c*, situated between the extremal magnets 53*a*, 53*b* of the static magnetic element 53 is polarized in the same direction as the mobile magnetic element 33.

The extremal magnets 53*a*, 53*b* act in similar fashion to the embodiment of FIGS. 3*a*, 3*b*, 3*c* in that they define, when facing the mobile magnetic element 33, unstable positions of the handling element 3. The intermediary magnet 53*c* faces the mobile magnetic element 33 when the handling element 3 is in its intermediary stable position S. The attraction between the mobile magnetic element 33 and the intermediary magnet 53*c* in this position strengthens the stability of the intermediary position as depicted in FIG. 5.

The handling element 3 can also be an interior manual lock button of the vehicle door latch. The manual lock button is in general vertically protruding from a vehicle door body interior. Pulling the manual lock button causes unlocking of the door while pushing it down causes the door to lock. The corresponding "up" and "down" positions are stable positions S, while an intermediary position, in which the locking and unlocking of the vehicle door latch 1 takes place, is an unstable position U.

Figure 7:
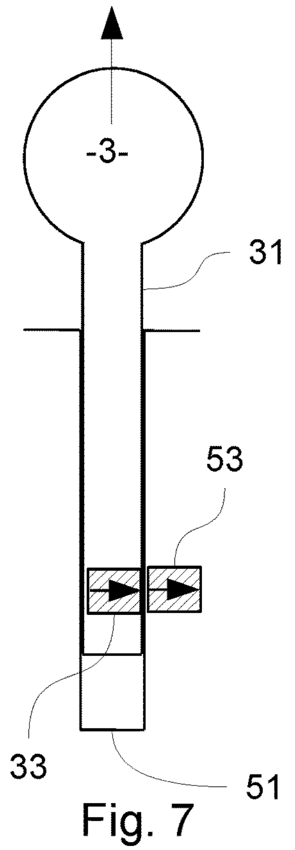
FIG. 7 is a schematic representation of a manual lock button with a haptic feedback based on the invention.

In FIG. 7, an embodiment of a manual lock button 3 is schematically represented in the intermediary unstable position. The handle or door frame 5 comprises a guiding corridor 51 with a single static magnetic element 53, the manual lock button 3 comprises a guiding rod 31 with a single mobile magnetic element 33. The mobile 33 and static magnetic elements 53 have the same polarity, and face each-other when in the represented intermediary position.

Abutments (not represented) define the stable positions, in which the mobile 33 and static magnetic elements 53 are furthest apart.

Other embodiments of manual lock button assemblies can be obtained based on the embodiments of FIGS. 5 and 6.

Figure 8:
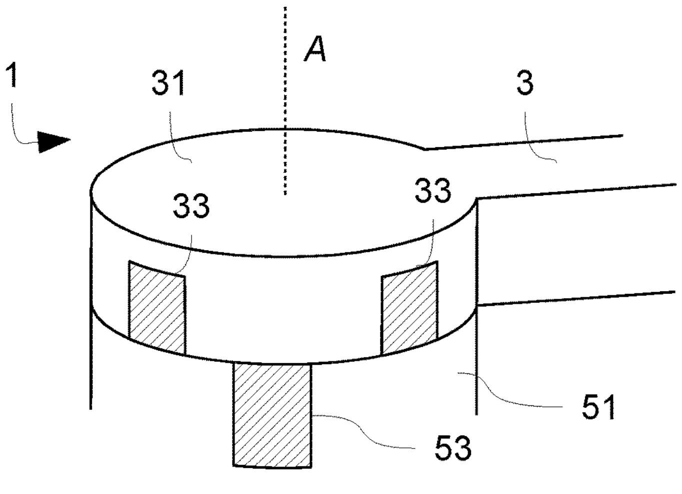
FIG. 8 is a schematic representation of an assembly where the handling element is rotating.

FIG. 8 is a partial representation of a vehicle door latch 1 where the mobile guiding element 31 is a rotor, mobile in rotation around a rotation axis A, and the static guiding element 51 is a stator, with respect to which the rotor 31 is mobile in rotation.

The static magnetic element 53 and the mobile magnetic element 33 are positioned in a peripheral position, at radial distance of the rotation axis A.

The static and mobile magnetic elements 51, 31 generate a resistive torque instead of a resistive force F by defining stable and instable rotational positions due to their mutual attraction or repulsion forces.

The invention claimed is:

1. A vehicle door latch assembly to control the opening of a vehicle door, comprising:

a door latch mechanism configured to release the vehicle door when actuated;

a handling element that is configured to be moved with respect to a handle frame between a rest position and an actuation position in which the handling element actuates the door latch mechanism; and at least one static magnetic element fixed in motion with the handle frame and at least one mobile magnetic element solidary in motion with the handling element, generating a haptic feedback by defining stable or unstable positions of the handling element in which the static magnetic element and mobile magnetic element face and attract or repel each other, wherein either the static magnetic element or the mobile magnetic element comprise at least two magnetic elements defining at least two unstable intermediary positions with a stable position in between said unstable positions, and wherein the static and mobile magnetic elements comprise magnets that define, when facing each other, unstable positions by repelling each other.

2. The vehicle door latch assembly according to claim 1, further comprising guiding means for the motion of the handling element comprising static guiding means attached to the handle frame, and mobile guiding means attached to the handling element, and wherein the static magnetic element is attached to the static guiding means and the mobile magnetic element is attached to the mobile guiding means.

3. The vehicle door latch assembly according to claim 2, wherein the static and mobile guiding means comprise a guiding finger and a rail or sheath along which the guiding finger slides in translation during motion of the handling element.

4. The vehicle door latch assembly according to claim 2, wherein the mobile guiding means comprise a rotor and the static guiding means comprise a stator, the rotor moving with respect to the stator in rotation during motion of the handling element.

5. The vehicle door latch assembly according to claim 1, wherein the magnets of the static and mobile magnetic elements comprise at least one permanent magnet.

6. The vehicle door latch assembly according to claim 1, wherein the magnets of the static and mobile magnetic elements comprise at least one electromagnet.

7. The vehicle door latch assembly according to claim 1, wherein when the handling element reaches the stable position, an instruction is sent to an authentication unit to cause said authentication unit to interrogate the presence of a security token carried by the user and authenticate said security token.

8. A vehicle door latch assembly to control the opening of a vehicle door, comprising:

a door latch mechanism configured to release the vehicle door when actuated;

a handling element that is configured to be moved with respect to a handle frame between a rest position and an actuation position in which the handling element actuates the door latch mechanism; and at least one static magnetic element fixed in motion with the handle frame and at least one mobile magnetic element solidary in motion with the handling element, generating a haptic feedback by defining stable or unstable positions of the handling element in which the static magnetic element and mobile magnetic element face and attract or repel each other, wherein either the static magnetic element or the mobile magnetic element comprise at least two magnetic elements defining at least two unstable intermediary positions with a stable position in between said unstable positions, and wherein at least one of respectively the static and mobile magnetic elements comprises magnets of alternating polarity, defining, when facing at least one magnet of respectively the mobile or static magnetic element at least one unstable position by repelling each other and at least one stable position by attracting each other.

* * * * *